July 20, 1954
M. F. CHUBB
2,684,481
METHOD OF MAKING ELECTRIC BATTERIES
Filed Aug. 24, 1950
2 Sheets-Sheet 1
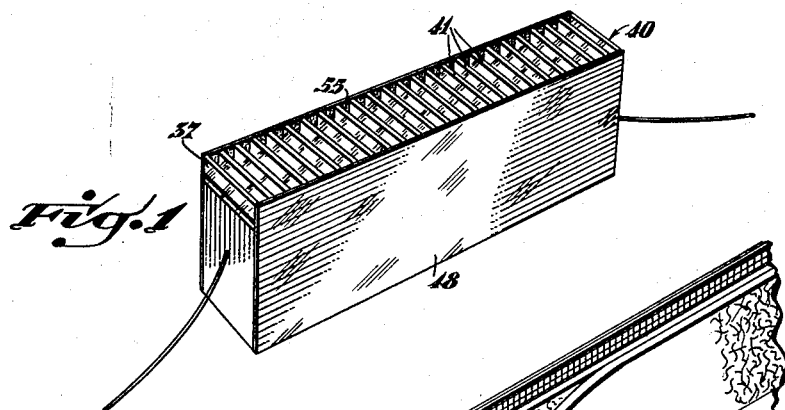
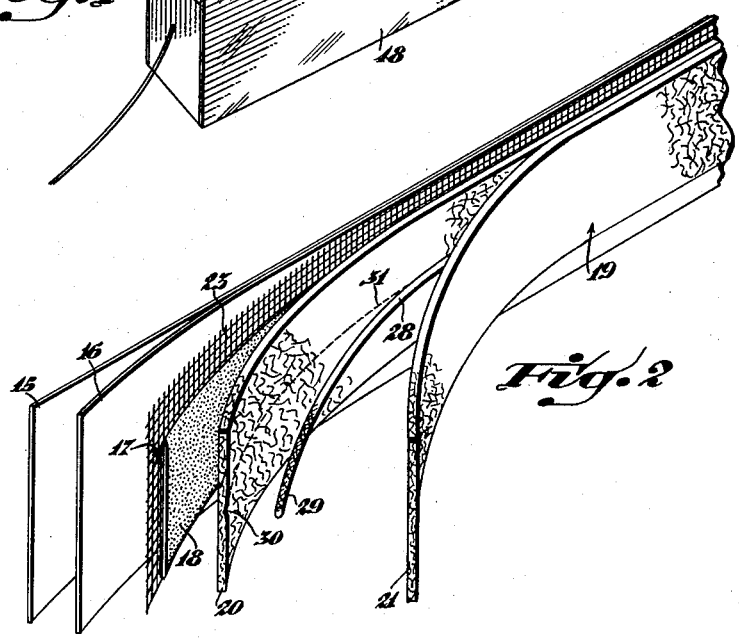
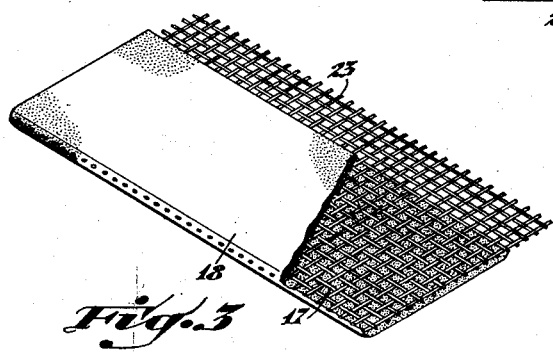
INVENTOR.
Melvin F. Chubb
BY
Wood, Arey, Henn & Sinn
ATTORNEYS July 20, 1954 — M. F. CHUBB — 2,684,481
METHOD OF MAKING ELECTRIC BATTERIES
Filed Aug. 24, 1950 — 2 Sheets-Sheet 2
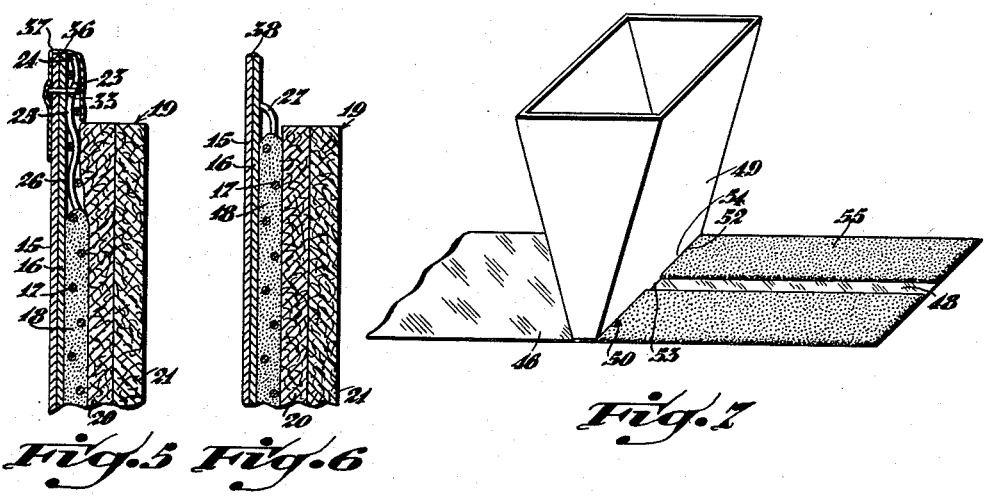
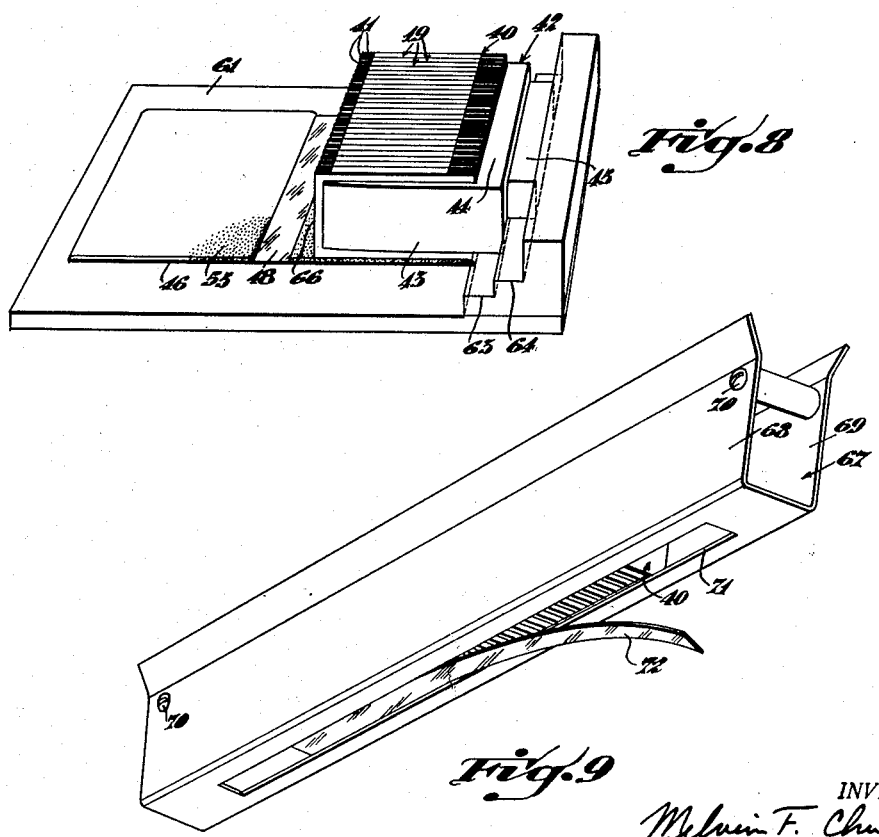
INVENTOR.
Melvin F. Chubb
BY
Wood, Arey, Herron & Evans
ATTORNEYS Patented July 20, 1954

2,684,481

UNITED STATES PATENT OFFICE 2,684,481

METHOD OF MAKING ELECTRIC BATTERIES

Melvin F. Chubb, Joplin, Mo., assignor to The Eagle-Picher Company, Cincinnati, Ohio, a corporation of Ohio Application August 24, 1950, Serial No. 181,248

12 Claims. (Cl. 136—112)

This invention relates to electric batteries and is particularly directed to a method of making light-weight electric storage batteries, and, in part, for example, to a method of making those of the type disclosed in my co-pending application, Serial No. 172,558, filed July 7, 1950, titled "Electric Battery."

Recently there has been an increased demand for batteries of the one-trip type, e. g., those which may easily be borne aloft by balloons or the like. Current demands insist on a single model battery which will provide, over a range of temperatures from tropical heat to sub-stratospheric cold, a supply of electricity for any of a variety of purposes. Such batteries may help power radio sets for transmitting signals to receiving stations. Batteries for these uses should be rugged and durable and must function whenever they are called upon to supply current. They should be as light in weight as is consistent with the requirements of durability and dependability, so that their weight will not add appreciably to an air-borne load.

This invention will be disclosed with particular reference to a battery comprising magnesium-cuprous chloride cells arranged in series, but it should be understood that most of the principles embodied in this invention are inherently adaptable to the fabrication of other batteries, and in fact may be applicable to batteries which differ greatly from these in appearance, size, constituents, final construction, or use, including batteries in which the cells are arranged in parallel instead of series, and those which are rechargeable instead of the one-trip kind.

One of the chief problems in the construction of storage batteries, especially those involving fluid constituents, is that of insulating each cell from the others. Otherwise, electrolyte, by flowing from one cell to another, by-passes the cell electrodes with the resultant loss in over-all efficiency.

Such short circuiting between just a few of the cells may impair the battery output to render that particular battery virtually worthless. Under operating load conditions the inadequacy of such batteries, even though the failure results from the defects of only a single cell, may have irreparable consequences.

Thus, it has been necessary to approach the problem of a light-weight, uniform discharge battery from the point of view of devising structure which effectively insulates each cell into a compartment separate from the others, yet which also accommodates simple and dependable means of electrical communication between cells regardless of the conditions under which the battery is in service and regardless of the rough treatment which it may be subject to before and during activation. The solution of this problem must be consummated by structure which does not add appreciably to the weight of the battery, which does not detract from its operative effectiveness, and, preferably, which is susceptible to cheap and speedy manufacture. It has also been necessary to plan a method of fabrication of such a battery which method does not involve impairing the utility of the battery. Thus, some materials or methods have had to be ignored, or tried and discarded, because their employment involved the use of temperatures which were destructive of one or another of the cell elements. Similarly, no method could be employed in the fabrication of the battery which involved the utilization of materials which were not chemically inert to the operative elements of the battery cells. Additionally, no material or method could be employed which resulted in a battery which could not receive and contain electrolyte, notably water, over its useful life. The method of this invention was devised with all these considerations in mind and provides a battery which more than satisfactorily performs over extremes of working conditions.

I have determined that batteries meeting the demands described may best be fabricated from a succession of wafer-like cell elements disposed in facial engagement in a repetitive sequence. Such a stack of elements is then encased, or nearly so, in a coating of organic material. Significantly, I have also found this structure results in each cell's being electrolytically isolated from the others. This is accomplished, in part, by inserting into the pile, at regular intervals, sheets of electrically conducting material. These sheets serve both as electrical connections between electrodes of opposite charges of adjacent cells and as physical barriers to the passage of electrolyte from one cell compartment to another. This barrier function of these divider sheets results from sealing the edgewise portion of the cell assemblies, i. e., the edges of the cell elements, with a hardenable resin-like coating applied to the external edgewise surfaces of the pile.

This invention is therefore predicated upon the concept that lightweight batteries of this type may best be fabricated by coating a stack of cell elements with a layer of viscous, hardenable resin-like material. Upon hardening of this coating, it satisfies a three-fold set of requirements. First, it integrates the respective cells into a unitary battery which may be easily handled and subjected to rigors of use. In addition to this function of actually holding the cells together, the hardened resinous casing provides a liquid-proof enclosure for the battery which obviates defects which might otherwise result from electrolyte contact with other portions of the assembly in use. Further, and significantly, the resinous encasement also insulates one cell from the others by establishing a seal along the edgewise portion of the cell elements, permitting electrically conducting sheets to demark one cell from the others.

It is desirable to employ a material which will not result in too brittle a casing. Further, it is important that the hardened coating neither expand nor contract with temperature changes such as may be encountered in the use of the battery. It should also be sufficiently viscous at temperatures of application to permit its incorporation onto the battery surface. Further, it must be chemically inert, or practically so, to the other constituents of the battery. I have found that a useful material to employ for these purposes is a vinyl resin plastisol. This vinyl plastisol is a thermo-setting resin which, upon its being hardened by heat, acquires characteristics entirely removed from its original properties.

The plastisol may be applied in any suitable manner. However, I prefer, for reasons which will later be made clear, to incorporate the plastisol along the edges of a battery unit by establishing a layer of it on a surface of a wrapper sheet and then enveloping the battery in the wrapper, material-carrying side innermost, so that an almost complete encasement for the battery is formed. The viscous or tacky plastisol is then hardened, forming a tough and durable insulating enclosure for the entire unit.

I have further found that the employment of such a plastisol accommodates the utilization of principles of fabrication of the battery which are in and of themselves desirable and novel. These methods cooperate with the sealing plastisol coating to provide an integrated battery of significantly improved qualities.

Thus, my invention is also concerned with the techniques of assembly of batteries containing a plurality of wafer-like elements. Briefly, one facet of this concept of my invention involves the establishment of a multi-ply laminate from a series of elongated strips, or strands, of elements, each of which may preferably be of greater than unit cell size. I have found that by employing such webs of materials that a variety of sub-assemblies, each advantageous in and of itself, may be readily employed in promoting the necessary association of the laminae into layer relationship.

These strips or webs are made to lie one on top of another, or facially adjacent, in an operative sequence. Preferably some, or all, of the respective strips should be physically secured together either in sub-assemblies or in complete cell unit assemblies, or both, before their final arrangement in facial engagement. Following the establishment of a relatively long continuous laminated strip of webs of these cell elements, such a multiple strip is subdivided into segments of unit cell size and stacked into a pile in a uniform sequence. Then, an organic coating is established about its edges. As previously described, this coating seals each cell into a compartment isolated from the others and avoids short circuiting between cells in that it blocks the creepage of electrolyte from one cell unit to another. Additionally, this enclosure serves as a casing which enables the battery to withstand appreciable handling and rough treatment. It also defines a complete battery and helps hold the respective cell elements in physical contact with each other.

I have further determined that this type of web fabrication of cell elements makes it possible, in an expedient fashion, to attach the various layers together when such attachment is necessary or desirable. Or, it may facilitate one operation or another on any of the various elements, such as pasting of an amorphous composition onto a rigid sheet. Further, this web fabrication subjects the elements to ready manipulation and helps insure registry of the elements one with another. This concept additionally enables the fabricator to employ a variety of assembly short-cuts best calculated to permit the large scale manufacture of batteries, each product being, for all practical purposes, identical with all of the others.

Not only does the strip assembly of cell elements promote ease of primary assembly but it also inherently provides, upon severing of the laminate, unit cell portions of appropriate dimensions so that, as an integral step in the completion of the battery, they may be stacked into an operative sequence.

It has also been an object and accomplishment of this invention to provide a battery which may be activated by the addition of water alone to it and which conjunctively remains inactivated until such addition of water. Further, I have provided means for incorporating into a battery desirable water-soluble or water-dispersible materials, e. g., salts, in such a fashion that they are rendered operative upon activation of the battery by addition of water thereto. Additionally, I have provided battery structure in which the aforementioned addition of water may be accomplished merely by immersing the complete battery unit into a vessel of water.

These foregoing general observations may be better understood by a detailed reference to one method of carrying out the invention, as described in the following paragraphs and depicted in the accompanying drawings in which:

Figure 1 is a perspective view of a completed battery of twenty-four cell units constructed in accordance with the principles of my invention, in which electrically conducting lead lines are diagrammatically shown extending from the respective ends of the battery.

Figure 2 is a somewhat schematic representation of the strips of the various cell elements in operative relationship, the end of the strip assembly in the foreground being peeled apart to show in some detail the identity of the respective elements.

Figure 3 is a perspective view, partly broken away, showing a portion of a cuprous chloride anode.

Figure 4 shows in cross section a fragmentary sub-assembly of a layer of a cuprous chloride anode and a layer of absorbent material.

Figure 5 is a vertical cross section taken through a single cell unit showing the relationship of the various cell elements following their assembly. In this figure there is indicated a sub-assembly unit of a layer of magnesium, a layer of copper and a layer of anode material to which may be attached the layer of absorbent material.

Figure 6 is a view similar to Figure 5 showing in vertical cross section a single cell unit of slightly different construction in which the sub-assembly of magnesium and copper sheets have been welded as at 38.

Figure 7 shows somewhat diagrammatically the application of a nearly continuous layer of a hardenable material to a surface of a wrapper sheet as a step preceding the enveloping of a stack of cell units in such a sheet.

Figure 8 shows, in perspective, a succeeding step in the operation of fabricating a battery. There, cell elements are temporarily held in a facial stack engagement with each other by means of a clamp with the clamped assembly abutting an aligning frame so that the coated wrapper sheet disposed beneath the clamped assembly, will, on its being drawn about the assembly, register properly with the stacked pile.

Figure 9 shows, in perspective, a step of fabrication succeeding that of Figure 8 in which the wrapper sheet constitutes an encasement for the battery and the wrapped pile has been inserted into a temporary retaining form for heat hardening of the coating on the stacked pile. Figure 9 particularly indicates the incomplete stripping of the relieved or non-coated portion of the wrapper sheet from the battery assembly, which is accomplished by tearing it from the rest of the wrapper through the opening provided in the temporary retaining form.

In order that electrolyte may be retained in the battery during its period of activation, the battery construction incorporates layers of an absorbent medium associated with each cell unit for retaining aqueous solution therein. Further, the structure here involved employs, instead of wires connecting one cell to another, electrically-conductive material in sheet form as the electrical inter-connection between cells. Conveniently, these sheets may be of the same facial area as the cell elements adjacent thereto. Then, by establishing a seal along the edgewise portion of the cell, these conducting sheets not only serve as the means of electrical communication between cells, but also act as physical barriers or divider sheets between adjacent cells, so that short circuiting through creepage of electrolyte around the edges of the electrodes is minimized and the full utility of such battery is more likely to be realized.

Essentially, the steps involved in making these batteries begin with the establishment of facially adjacent layers of cell elements in the following uninterrupted sequence: a layer of copper, a layer of material which serves as a carrier for cuprous chloride, a layer of absorbent medium, and a layer of magnesium. These four elements are the essential constituents of a unit cell. The magnesium comprises the cathode of a cell; cuprous chloride is the anode of a cell; the copper layer divides cells one from another and provides electrical communication between adjoining cells; and the absorbent medium spaces the anode from the cathode and furnishes retaining means for confining electrolyte in the cell during periods of activation.

The arrangement just described is best seen in Figures 2, 5 and 6. There are shown a sheet 15 of magnesium, a sheet 16 of copper, a screen 17 carrying at 18 a paste principally composed of cuprous chloride, and a composite absorbent layer 19, consisting, as shown, of two parts of otherwise identical layers 20 and 21 of absorbent material.

Screen 17, which carries cuprous chloride, may preferably be made of bronze. As will appear, any electrically conducting material onto which a paste of cuprous chloride may be charged will be more or less suitable for this purpose. Portions 23 of the bronze screen, or grid, carrying cuprous chloride are left exposed when the paste is charged into the interstices of the screen. These portions should be somewhat yieldable, or flexible, so that sections thereof will be in physical engagement with the adjacent layer of copper. Thus, as shown in Figure 5, the exposed screen portion 23 abuts, at 24, 25, and 26, the layer 16 of copper, thereby insuring the flow of current from the anode 17 of one cell to a cathode 15 of an adjacent cell through the copper sheet 16. In Figure 6, the exposed portions 27 of screen 17 are laterally bent to insure pressure engagement against copper sheet 16 for the same purposes.

It will be appreciated that, if desired, the cuprous chloride paste may be charged onto only only one surface of the screen thereby leaving exposed one metallic surface of the screen which may be disposed facially adjacent the copper plate for electrical contact therewith. Alternatively, exaggerated fingers of the general type of fingers 27 may be formed at an extremity of the screen and the cuprous chloride paste be charged over the entire area of the screen except for the exact tips of the fingers which will be left exposed since they protrude beyond the thickness of the layer so established. In any event, electrical interconnection between adjacent cells should be insured by leaving a portion of the electrically conducting material of the cuprous chloride carrier free for physical engagement with the divider sheet of copper.

The absorbent material employed to retain electrolyte during activation of the battery may preferably consist of felted rayon fibers held together with a vinyl binder although any chemically inert material which is adapted to absorb aqueous solution may be used for this purpose. Preferably, absorbent layer 19, in strip form, is not quite so wide as the other cell elements such as magnesium strip 15, copper strip 16 and anode wire gauze 17. Thus, as best shown in Figure 8, absorbent material 19 will be intermediately disposed of the other cell elements.

In a preferred practice of my invention, I stitch together, prior to the establishment of a lamination, a strip 20 of absorbent material and a strip 17 of bronze wire screening. Onto this subassembly of screen with its fabric backing, I then spread a paste composition of cuprous chloride over the screen surface. The paste penetrates the openings to the absorbent layer 20 and adheres firmly thereto. This particular sub-assembly is shown, fragmentarily, in Figure 4. In order to prepare cuprous chloride for satisfactory spreadability and to prevent its crumbling away once applied to the screen I have found it useful to add about 10%, by weight, of a polystyrene binder, which produces a mixture of a consistency which may be easily applied to a screen surface and which shortly hardens into a cake which is not easily fractured.

It may be thought desirable to have certain water-soluble or water-dispersible substances in the battery proper at the time of activation of the battery upon introduction of water or an aqueous solution. Since it is more convenient, especially in operations in the field, to apply water alone as an electrolyte rather than a water solution or dispersion of other substances, I have found that this end may be accomplished by impregnating a fibrous thread with such water-soluble or water-dispersible substances and then incorporating such thread in the initial fabrication of the battery. Thus, thread 28 may carry on its surface particles 29 of water-soluble or water-dispersible solids. As shown in Figure 2, it may conveniently nestle in the trough 30 formed by the line of stitching 31 joining absorbent strip 20 and bronze gauze 17. In order that the solids impregnated in thread 28 may be distributed evenly throughout the cell between the electrodes there is provided a second absorbent layer 21, which together with absorbent layer 20, forms the complete electrolyte-confining element 19.

In magnesium-cuprous chloride cells I have found it desirable to add from 0.1% to 2.5% by weight of each of ammonium chloride and cadmium chloride, the former to promote activation of the cells and the latter to avoid overheating. These may preferably be constituted on the surface of thread 28.

In assembling thin strips of material in such a fashion that their edges will be in registry, I have found it desirable to secure some or all of the respective strips together. This avoids lateral translation of one strip relative to the other, which would result in uneven edges of the layer assembly. Additionally, since the respective metallic members must be in physical contact to insure interconnection between adjacent cells, the physical attachment for assembly purposes also results in construction in which copper sheets 16 bear against both magnesium sheet 15 and anode 17. Nonetheless, I have found that such positive physical attachment is not essential in a completed battery since mere pressure contact of copper plates 16 against adjacent faces of magnesium plates 15 and anodes 17 is sufficient to insure operation of the battery.

Alternative methods of attaching together the metallic elements are indicated in Figures 5 and 6. In Figure 5 magnesium plate 15, copper plate 16 and cuprous chloride anode 17 are attached by means of stitching 33, or stapling, penetrating all three metallic elements. The very thinness of the respective sheet members accommodates this method of attachment. The stitching may be of animal, vegetable or synthetic fiber or of metal or any other suitable filament. Preferably, but not necessarily, the secured end 36 of this sub-assembly is encased by a strip of tape 37 which protects the attaching means from weathering or accidental rupture and produces a smooth, rounded edge instead of what might otherwise be a sharp or jagged protuberance.

The stitching or stapling which results in the assembly shown in Figure 5 is preferably carried out along the exposed upper ends of a multi-ply web such as depicted in Figure 2. The operator merely runs a stitching or stapling machine along the top edge of the three metallic elements. If the sub-assembly of anode 17 and absorbent layer 20 shown in Figure 4 is employed, then the immediate result of the stitching or stapling of the three metallic elements together will result in a four-ply laminate of magnesium strip 15, copper strip 16, anode 17 and absorbent material 20.

In Figure 6 magnesium sheet 15 and copper sheet 16 have been electrically edge welded in an inert, protective atmosphere, to attach them together, as at 38. Contact between anode 17 and a copper face of the bimetallic welded-together strip is insured by the configuration of fingers 27 although other means of attachment may be employed if desired.

It may also be found desirable in either the stitching or welding operations to temporarily secure the metallic members together prior to and during the stitching or welding, for otherwise these strips might slip with respect to each other and result in an uneven edge. Thus, a strip of tape similar to strip 37 may be employed at either longitudinal edge of the multi-ply metallic sub-assembly before it is mechanically joined. If strip 37, shown in Figure 5 had been so applied, then of course stitching 33 would penetrate both faces of it. Alternatively to the edge welding shown in Figure 6 magnesium strips 15 and copper strips 16 may be spot-welded together. These welds should be spaced so that there is at least one associated with each cell unit, when such portions are cut from the original strip.

When a set of cell elements in strip form such as that in Figure 2 has been constructed, this strip is then cut into segments of unit cell size and these individual segments are stacked one upon the other uniformly. Because of the advantages earlier mentioned in physically attaching the copper and magnesium plates it is noted that the preferred unit assembly such as shown in Figures 2, 5 and 6 in reality contains a magnesium cathode 15 of one cell and cuprous chloride bearing anode 17 of another cell. It should be appreciated that, in the stacked assembly, however, a magnesium sheet 15 will always be disposed adjacent an absorbent layer 21. Further, inherently in the arrangement, there is disposed, between each pair of copper plates 16, an anode 17, a composite absorbent layer 19 and one cathode 15.

Each segment cut from such a strip contains all the cell elements for a single cell. When artificial attaching means have been employed each such segment will be an easily handleable unit or package so that a multi-cell battery can be constituted merely by stacking the respective segments one upon the other in the same order. Each magnesium face of the bi-metallic plate of magnesium and copper in such a stack facially abuts an absorbent layer 21 in a stack of a plurality of such segments. In the final product the individual cells or cell units making up such a stack need not be positively attached one to the other, but during fabrication I have found it desirable to maintain the stack 40 of cell units 41 in pressure engagement with each other. Suitable means for accomplishing this are demonstrated in Figure 8 in which a number of discrete cell units 41 are temporarily held together by a clamp 42. Clamp 42 consists of two arms 43 engaging the opposite faces of stack 40 with a yoke 44 joining the arms. Attached to or integral with yoke 44 is a bar 45 smaller in breadth than yoke 44 defining a step contour as shown in Figure 8. Clamping frame 42 is arranged about stack 40 so that three of the four lateral edges of the respective cell elements are left exposed. Yoke 44 is disposed alongside the fourth side of the lateral edges.

After a stack 40 of cell units 41 is constituted the next step is to enclose such a stack in such a manner that the enclosure also serves to seal the respective cells each from the other. Preparatory to the step of establishing such a seal I prepare, as shown in Figure 7, a wrapper sheet 46 carrying on one face thereof a layer of a vinyl resin plastisol. The specific vinyl resin plastisol which I have found most useful consists of a mixture of vinyl acetate and vinyl chloride in a plasticizer-solvent of dioctyl phthallate and an ester of ricinoleic acid. This plastisol has a fusion temperature of 350° F. and is normally of pasty or viscous consistency. In addition, it contains a small percentage of gelling agent which serves to cause the paste to immobilize itself upon the wrapping tape on which it is deposited as a layer prior to attachment to the battery.

A central portion 48 of the wrapper sheet is left uncoated by the plastisol for a purpose to be explained shortly. This coating is established on sheet 46 by charging the plastisol into a hopper 49, which has a discharge end 50. One lip 52 of this discharge end 50 has a tab 53 centrally located thereon which extends lower than the other side portions 54 of the lip. A wrapper sheet 46 is drawn over a table or the like underneath the discharge end of hopper 49 and by gravity feed a coating 55 of plastisol is established on one face of wrapper sheet 46. Because of the relationship between tab 53 and relieved portions 54 plastisol will be spread over all but the central portion 48 of the wrapper sheet. Tab 53 in effect scrapes against the surface of wrapper sheet and prevents a layer of plastisol from being deposited thereon.

As indicated in Figure 7 a strip of plastisol-laden wrapper sheet 46 may be prepared in one operation, which strip is substantially longer than that needed for encasing a single battery. The coated sheet is then cut into the size indicated in Figure 8 for the step of incorporating the plastisol onto the edges of the battery stack 40. I dispose wrapper sheet 46, tacky side up, on a flat surface 61. Platform 61 has, at one end, terraces 63 and 64 adapted to cooperate with the corresponding stepped portions of clamp 42. Wrapper sheet 50 is aligned at the foot of terraces 63 and 64. The clamped assembly 40 and 42 is laid in position with yoke 44 and bar 45 resting on the terraces to which they correspond to insure that the uncoated portion 48 of wrapper sheet 46 will coincide with a central portion of end 66 of stack 40. From the position shown in Figure 8 wrapper sheet 46 is drawn up and over the clamped assembly and the plastisol layer thus engages side portions of stack 40. The clamped stack, now carrying a wrapper sheet thereabout, is then placed in a temporary frame 67. Sides 68 and 69 of frame 67 are drawn together by adjusting bolts 70. These sides bear against the outer surfaces of wrapper sheet 46 causing the plastisol layer to become intimately associated with the edgewise portions of stack 40.

The battery stack frame 67 and its contents are then placed in an oven maintained at 350° F. and the hardening of the plastisol layer is thus effected. Upon removal from the oven the once-viscous plastisol will have hardened and results in a continuous bond along the edges of stack 40, effectively insulating each cell from the adjacent ones.

Frame 67 has a slit-like opening 71. The clamped stack 40 is inserted into frame 67 so that end 66 adjacent the uncoated portion of wrapper sheet 46 will be disposed adjacent this slit. Following the heat hardening of the plastisol in the oven this uncoated portion 48 is peeled away to expose endwise portions of each of the cells. This uncoated strip 72 is torn away and discarded. The openings thus formed in the completed battery facilitate the introduction of electrolyte into each of the cells either by its being poured into the open top face of the battery, air thereby escaping from the bottom or by dipping the battery into a vessel containing electrolyte, the liquid rising through the battery through capillary action.

The use of cadmium chloride as an electrolyte in a cuprous chloride magnesium type of battery is disclosed and claimed in my co-pending application Serial No. 421,424, filed April 6, 1954, which is a continuation in part of this application.

Having described my invention, I claim:

1. A method of making electric batteries which comprises establishing a laminate of strips of magnesium, copper, cuprous chloride bearing anode material and absorbent material in that order; severing said laminate into segments of unit cell size, stacking said segments into a pile and enveloping the edgewise portion of said pile with an impervious casing whereby each layer of copper constitutes a physical barrier to passage of electrolyte from one cell to another.

2. A method of making electric batteries which comprises assembling strips of copper, magnesium, cuprous chloride bearing anode material and absorbent material one upon the other, severing the assembly thus formed into segments of unit cell size, stacking said segments one upon the other into a pile; the foregoing operations being carried out to provide a continuous repetitive sequence of a layer of copper, a layer of anode material, a layer of absorbent material and a layer of magnesium; and encasing edgewise portions of said pile in an impervious encasement whereby said layers of copper act as physical barriers to prevent the creepage of electrolyte from one cell to another.

3. The method of making electric batteries which comprises stacking wafer-like cell elements into a pile; said pile including; an anode and a cathode for each cell, absorbent material disposed between the anode and cathode of each cell and layers of electrically conducting material with their edges substantially flush with the remainder of the pile demarking one cell from another; coating a wrapper sheet with a layer of a vinyl plastisol; wrapping said sheet about said pile with the material-carrying side of said sheet innermost; and effecting the hardening of said plastisol coating while said sheet is maintained against said pile in pressure engagement therewith.

4. A method of making electric batteries which comprises establishing a pile of cell units, said pile having sheets of electrically conducting material disposed between adjacent cells, said sheets having their edges substantially flush with the edges of the remainder of said pile, establishing a coating of a vinyl plastisol along the edgewise portions of said stack, the plasticizer-solvent for said vinyl plastisol consisting essentially of the dioctyl ester of phthallic acid and a mono-ester of ricinoleic acid, and subjecting the thus-coated stack to a temperature of approximately 350° F. for a time sufficient to harden said plastisol.

5. A method of making electric batteries which comprises establishing a stack of cell elements in which sheets of electrically conducting materials serve as divider sheets between adjacent cells, maintaining said stack under sufficient pressure to insure facial contact of adjacent elements, coating the exposed lateral edges of said stack with a heat hardenable vinyl plastisol adapted to constitute a liquid-proof encasement along said edges, heating said coated stack to a temperature and for a time sufficient to harden said plastisol and establishing openings associated with opposed ends of each of said cells for facilitating the introduction of electrolyte thereto.

6. A method of making electric batteries which comprises constituting a stack of cell units in which layers of electrically conducting material constitute divider sheets between adjacent cells, establishing on one surface of a wrapper sheet a layer of hardenable material continuous except for a channel which corresponds in length to one side of said stack, wrapping said sheet with its material-carrying side innermost about said stack so that said uncoated channel thereof coincides with said side of said stack, effecting the hardening of said material, and then removing the uncoated channel of said wrapper sheet from said stack whereby openings are formed in each cell facilitating introduction of electrolyte thereto.

7. A method of making magnesium-cuprous chloride electric batteries which comprises stitching together a sub-assembly of a strip of an electrically conducting foraminous material and a strip of an absorbent material, constituting a paste of cuprous chloride, charging said paste into the pores of said foraminous material, stacking a pile of cell elements, said pile having a layer of said stitched sub-assembly of unit cell facial area in each cell, and enclosing edgewise portions of said stack in an impervious casing whereby liquid-proof seals are constituted along the edges thereof.

8. A method of making electric batteries which comprises longitudinally stitching together a strip of a foraminous electrically conducting material and a strip of copper to insure facial contact between the assembly of said strips over the length thereof, severing said stitched assembly into segments of unit cell size, establishing a stack of wafer-like cell elements including in said stack a plurality of said segments with the copper face of each of said segments engaging a magnesium cathode and the foraminous portion of said segments having cuprous chloride charged into the pores thereof to constitute anodes, the cuprous chloride face of each of said segments facially engaging layers of absorbent material in said stack, and compressing said stack sufficient to insure electrical communication between the magnesium cathode of one cell with the cuprous chloride anode of an adjacent cell through the copper which is in stitched association with said cuprous chloride anodes.

9. An electric battery of the type to be activated upon the addition of water thereto, said battery comprising a plurality of magnesium pasted-cuprous chloride cells, each of said cells having absorbent material for retaining water therein and having a string impregnated with cadmium chloride embedded in the absorbent material of each of said cells.

10. A method of making electric batteries which comprises forming sheets of magnesium and copper into strips, welding said strips together into face to face relationship, utilizing a plurality of said welded bi-metallic strips in constituting a pile of cell elements, the copper faces of said welded strips engaging electrically conducting portions of a cuprous chloride anode and the magnesium faces of said strips engaging a layer of absorbent material, and permanently establishing such facial engagement of the components of said stack.

11. A method of making electric batteries which comprises forming sheets of magnesium and copper into strips, welding the edges of said strips together, in a protective atmosphere, utilizing a plurality of said welded bi-metallic strips in constituting a pile of cell elements, the copper faces of said welded strips engaging electrically conducting portions of a cuprous chloride anode and the magnesium faces of said strips engaging a layer of absorbent material, and permanently establishing such facial engagement of the components of said stack.

12. An electric battery which may be activated by the addition of water thereto, said battery comprising a plurality of magnesium cuprous chloride cells, each of said cells having electrodes spaced apart by water absorbent material, at least one strand of thread bearing an electrolytic salt contained in the absorbent portions of each of said cells, said cells arranged in series relationship with each other, sheets of copper constituting the electrical inter-connection between adjacent cells, said cells and the said copper sheets being disposed in a pile relationship, the edgewise portions of said pile being coated with a hardened vinyl plastisol composition forming liquid-proof seals and defining, in conjunction with said copper sheets, a plurality of cell compartments.

References Cited in the file of this patent

UNITED STATES PATENTS

| Number | Name | Date |
| --- | --- | --- |
| Re. 14,929 | Baumann | Aug. 17, 1920 |
| 1,797,161 | Strohl | Mar. 17, 1931 |
| 2,040,255 | Gordon | May 12, 1936 |
| 2,322,210 | Adams | June 22, 1943 |
| 2,416,576 | Franz | Feb. 25, 1947 |
| 2,422,045 | Ruben | June 10, 1947 |
| 2,475,153 | Rock | July 5, 1949 |
| 2,519,052 | Krachenfels | Aug. 15, 1950 |
| 2,519,053 | Reinhardt | Aug. 15, 1950 |
| 2,519,054 | Woodring | Aug. 15, 1950 |
| 2,536,697 | Ruben | Jan. 2, 1951 |
| 2,543,106 | Harriss | Feb. 27, 1951 |
| 2,564,495 | Mullen | Aug. 14, 1951 |

FOREIGN PATENTS

| Number | Country | Date |
| --- | --- | --- |
| 482,363 | Great Britain | Mar. 24, 1938 |